United States Patent
Qiu et al.

(10) Patent No.: US 10,973,180 B2
(45) Date of Patent: Apr. 13, 2021

(54) SELF-PRIMING WATER TURBINE-DRIVEN REEL SPRINKLER IRRIGATION MACHINE

(71) Applicants: JIANGSU HUAYUAN WATER-SAVING CO., LTD, Jiangsu (CN); China University of Mining and Technology, Jiangsu (CN)

(72) Inventors: Zhipeng Qiu, Jiangsu (CN); Tao Peng, Jiangsu (CN); Peiyong Liu, Jiangsu (CN); Jinxiang Zhang, Jiangsu (CN); Zhencai Zhu, Jiangsu (CN); Fan Jiang, Jiangsu (CN)

(73) Assignees: JIANGSU HUAYUAN WATER-SAVING CO., LTD, Jiangsu (CN); China University of Mining and Technology, Jiangsu (CN)

( * ) Notice: Subject to any disclaimer, the term of this patent is extended or adjusted under 35 U.S.C. 154(b) by 190 days.

(21) Appl. No.: 16/337,914

(22) PCT Filed: Jun. 25, 2018

(86) PCT No.: PCT/CN2018/092576
§ 371 (c)(1),
(2) Date: Mar. 28, 2019

(87) PCT Pub. No.: WO2019/178964
PCT Pub. Date: Sep. 26, 2019

(65) Prior Publication Data
US 2021/0000026 A1    Jan. 7, 2021

(30) Foreign Application Priority Data

Mar. 21, 2018  (CN) .......................... 201810235831.5

(51) Int. Cl.
*A01G 25/09*    (2006.01)
*B05B 9/00*    (2006.01)
(Continued)

(52) U.S. Cl.
CPC .............. *A01G 25/09* (2013.01); *B05B 9/007* (2013.01); *B05B 9/0403* (2013.01); *A01G 25/095* (2013.01); *B05B 3/18* (2013.01)

(58) Field of Classification Search
CPC ...... A01G 25/09; A01G 25/095; B05B 9/007; B05B 9/0403; B05B 3/18
(Continued)

(56) References Cited

U.S. PATENT DOCUMENTS 3,346,213 A * 10/1967 Nelson ................. A01G 25/095
242/390
3,684,178 A * 8/1972 Friedlander .......... A01G 25/095
239/745
(Continued)

FOREIGN PATENT DOCUMENTS

| CN | 2346184 | 11/1999 |
|---|---|---|
| CN | 103843647 | 6/2014 |

(Continued)

OTHER PUBLICATIONS

"International Search Report (Form PCT/ISA/210)", dated Nov. 15, 2018, pp. 1-5.

*Primary Examiner* — Joseph A Greenlund
(74) *Attorney, Agent, or Firm* — JCIPRNET

(57) ABSTRACT

A self-priming water turbine-driven reel sprinkler irrigation machine includes a framework, a plug board, a reel, a PE pipe, a water turbine driving device, a sprinkler wagon, and a self-priming device. The framework comprises an underframe, a reel support frame, a plug board support frame, and a wheel assembly. A bottom portion of the underframe is provided with an underframe rotary device, and the underframe rotary device comprises a rotary bearing and a chassis support member. An inner ring of the rotary bearing is fixedly mounted to the underframe, and an outer ring of the rotary bearing is fixedly mounted and connected to the (Continued)

chassis support member. A telescopic front support is disposed at a front part of the underframe. The wheel assembly comprises a wheel support beam, a wheel, and a wheel lifting hydraulic cylinder. The self-priming device comprises a water pump, a pumping hose, and a filtering mechanism.

10 Claims, 6 Drawing Sheets

(51) Int. Cl.
  *B05B 9/04* (2006.01)
  *B05B 3/18* (2006.01)
(58) Field of Classification Search
  USPC .................................................. 239/745
  See application file for complete search history.

(56) References Cited

U.S. PATENT DOCUMENTS

| | | | | |
|---|---|---|---|---|
| 3,771,720 | A | | 11/1973 | Courtright |
| 4,003,519 | A | * | 1/1977 | Kruse ................. A01G 25/095 239/745 |
| 4,174,809 | A | * | 11/1979 | Arlemark ............ A01G 25/095 137/355.2 |
| 4,186,881 | A | * | 2/1980 | Long .................... A01G 25/095 137/355.12 |
| 4,232,826 | A | * | 11/1980 | Broughton .......... A01G 25/095 239/112 |
| 4,346,843 | A | * | 8/1982 | Long .................... A01G 25/095 137/615 |
| 4,756,260 | A | * | 7/1988 | Petersen ............. A01C 23/021 111/123 |
| D327,114 | S | * | 6/1992 | Van Kirk .................... D23/214 |
| 2020/0128766 | A1 | * | 4/2020 | Qiu ...................... A01G 25/09 |
| 2020/0281135 | A1 | * | 9/2020 | Qiu ...................... A01G 25/095 |

FOREIGN PATENT DOCUMENTS

| | | |
|---|---|---|
| CN | 105532375 | 5/2016 |
| CN | 108432606 | 8/2018 |
| CN | 207969491 | 10/2018 |

\* cited by examiner

SELF-PRIMING WATER TURBINE-DRIVEN REEL SPRINKLER IRRIGATION MACHINE

CROSS-REFERENCE TO RELATED APPLICATION

This is a 371 application of the International PCT application serial no. PCT/CN2018/092576, filed on Jun. 25, 2018 which claims the priority benefits of China Application No. 201810235831.5 filed on Mar. 21, 2018. The entirety of each of the above-mentioned patent applications is hereby incorporated by reference herein and made a part of this specification.

BACKGROUND

Technical Field

The present invention belongs to the technical field of sprinkler irrigation equipment, relates to a reel sprinkler irrigation machine, and in particular, to a self-priming water turbine-driven reel sprinkler irrigation machine.

Description of Related Art

Sprinkler irrigation is an irrigation method of sprinkling pressurized water into the air by means of a special-purpose apparatus, such as a sprinkler to form water drops to the ground sprinkling surface and the surfaces of the crops. The sprinkler irrigation machine is also called a sprinkler irrigation implement and a sprinkler irrigation unit, i.e., a special-purpose apparatus for sprinkler irrigation.

The reel sprinkler irrigation machine is a common type of sprinkler irrigation machine. The reel sprinkler irrigation machine can irrigate a large area of farmland, and can also control the amount of water spray according to the sprinkler to meet different requirements of a user for water volume of sprinkler irrigation, and thus is generally selected for water-saving irrigation of farmland.

The reel sprinkler irrigation machine generally adopts a water turbine power-driven system, and generally the reel sprinkler irrigation machine mainly includes an underframe, a reel support frame, a reel, a PE pipe, a water turbine, a gearbox, a speed compensation device, and a sprinkler wagon. In operation, a PE water pipe wound on the reel and the sprinkler wagon connected to the PE water pipe are generally dragged to a preset irrigation site by a traction apparatus such as a tractor or a winch, and then a sprinkler irrigation pressurized water valve is opened, so that the sprinkler irrigation pressurized water enters the PE water pipe to be sprayed from a sprinkler of the sprinkler wagon for sprinkler irrigation and driving the water turbine to rotate, the water turbine drives a water turbine shaft to rotate and output power to a speed reducer, and after the speed reduction, the chain transmission generates a larger torque to drive the winch to rotate, achieving automatic recovery of the PE pipe.

In addition, in order to facilitate changing a dragging direction of the sprinkler wagon, and thus to facilitate adjusting the sprinkler irrigation direction according to a specific arrangement direction of the farmland, the reel support frame of the reel sprinkler irrigation machine is generally erected on the underframe by means of a rotary bearing, and a rotation angle of the reel support frame relative to the underframe is controlled through rotation to achieve adjustment of the sprinkler irrigation direction. This conventional reel sprinkler irrigation machine has the following drawbacks:

1. The pressurized water input of the conventional reel sprinkler irrigation machine generally depends on a pressurized water hydrant, and the fields adjacent to the irrigation canals and without the pressurized water hydrant need to be additionally equipped with a submersible pump for supplying pressurized water, and in general, the submersible pump operates on a power supply, thus being limited by the usage conditions.

2. Since the reel sprinkler irrigation machine is generally hauled to the farmland to be sprinkled by the traction apparatus such as the tractor, and the farmland is often limited in space in order to ensure the largest planting area, it is difficult for the conventional reel sprinkler irrigation machine to turn around, and when the sprinkler irrigation operation is completed, the turnaround will often cause the crops in the fields to be excessively crushed.

3. The road wheels at a bottom portion of the underframe of the conventional reel sprinkler irrigation machine are generally directly mounted on the underframe, and therefore, a distance between the bottom portion of the underframe and the ground is fixed. To ensure the overall stability of the reel sprinkler irrigation machine, it is generally necessary to lower a center of gravity of the whole machine, resulting in a relatively small distance between the bottom portion of the underframe and the ground, so that a chassis would generally be scratched when the road surface is uneven during turnaround.

SUMMARY

In view of the foregoing problems, the present invention provides a self-priming water turbine-driven reel sprinkler irrigation machine, which enables easy adjustment of the sprinkler irrigation direction and flexible turnaround of the reel sprinkler irrigation machine under the premise of self-pumping water for sprinkler irrigation operation, and avoids scratching of the chassis caused by the uneven road surface, and is especially suitable for sprinkler irrigation operation in the fields adjacent to the irrigation canals and without the pressurized water hydrant.

To achieve the foregoing objective, the self-priming water turbine-driven reel sprinkler irrigation machine comprises a framework, a plug board, a reel, a PE pipe, a water turbine driving device, a sprinkler wagon, and a self-priming device.

The framework comprises an underframe, a reel support frame, a plug board support frame, and a wheel assembly.

The underframe is a planar support frame structure that is bilaterally symmetrical as a whole, and the support frame structure comprises a boundary beam closely connected to form an annular frame structure and a support beam connected to an interior of the annular frame structure. A traction connecting mechanism is disposed at a front end of the underframe. A bottom portion of the underframe is provided with an underframe rotary device, and the underframe rotary device is disposed at a center of gravity of the framework and comprises a rotary bearing and a chassis support member sequentially from top to bottom. The rotary bearing comprises an inner ring, an outer ring, and a rotary drive. The inner ring of the rotary bearing is fixedly mounted and connected to the underframe, the outer ring of the rotary bearing is fixedly mounted and connected to the chassis support member, and the rotary drive of the rotary bearing is fixedly mounted on the underframe and is matingly mounted and connected to the outer ring of the rotary bearing through a transmission mechanism. The chassis support member is provided with a flat support base plane. A telescopic front support is vertically disposed at a front part of the underframe, and the telescopic front support comprises a front support extension and retraction control member.

Two reel support frames are provided, and the two reel support frames are symmetrically and vertically mounted on the planar support frame structure of the underframe corresponding in position to the underframe rotary device.

Two plug board support frames are provided, and the two plug board support frames are symmetrically and fixedly mounted on the underframe or the reel support frame, and the plug board support frames extends rearwards.

Two wheel assemblies are provided, and the two wheel assemblies are symmetrically mounted at a rear part of the bottom portion of the underframe. The wheel assembly comprises a wheel support beam, a wheel, and a wheel lifting control member. A front end of the wheel support beam is hingedly connected to the underframe, and the wheel is provided to roll back and forth and is mounted and connected to a rear end of the wheel support beam. The wheel lifting control member has one end connected to the reel support frame or the plug board support frame and the other end connected to the wheel support beam. When the wheel lifting control member is completely retracted, a horizontal plane where a bottom portion of the wheel is located is located above the support base plane of the chassis support member.

Two plug boards are provided, and the two plug boards are symmetrically mounted on a rear end of the plug board support frame. The plug board is provided with a sprinkler wagon return limiting member, and comprises a plug board lifting control member and a rollback stopping safety member. The rollback stopping safety member is disposed on the sprinkler wagon return limiting member.

The reel is provided to roll back and forth and is erected at a top of the reel support frame through a bearing, and left and right side plates of the reel are provided with annular outer gear rings concentric to the reel.

The PE pipe is wound on the reel, and an input end of the PE pipe penetrates through an axial center of the reel.

The water turbine driving device comprises a water turbine box and a reel driving gearbox. The water turbine box is fixedly mounted on the reel support frame. The water turbine box comprises a pressurized water input port, a pressurized water output port, and a water turbine disposed inside the water turbine box. The pressurized water output port of the water turbine box communicates with an input end of the PE pipe. The water turbine of the water turbine box comprises a power output shaft. The reel driving gearbox is fixedly mounted on the underframe. The reel driving gearbox comprises a power input shaft and a power output shaft. The power input shaft of the reel driving gearbox is connected to the power output shaft of the water turbine of the water turbine box through the transmission mechanism, and the power output shaft of the reel driving gearbox is matingly connected to the annular outer gear ring through the transmission mechanism.

The sprinkler wagon comprises a sprinkler frame, a support wheel, and a sprinkler. The support wheel is mounted at a bottom portion of the sprinkler frame. The sprinkler is fixedly erected on the sprinkler frame, and an input end of the sprinkler is connected to an output end of the PE pipe. The sprinkler frame is provided with a collision block corresponding in position to the rollback stopping safety member of the plug board.

The self-priming device is fixedly mounted on the underframe, and comprises a pumping power source, a water pump, a pumping hose, and a filtering mechanism. The pumping power source is connected to the water pump. An input end of the water pump is connected to the filtering mechanism through the pumping hose, and an output end of the water pump is connected to the pressurized water input port of the water turbine box through a pipeline.

As a further improvement of the present invention, the self-priming device further comprises a pumping hose suspension bracket, and the pumping hose suspension bracket comprises a cantilever and a pumping hose lifting mechanism. A bottom end of the cantilever is fixedly mounted on the underframe. A cantilever rotary drive for rotating the cantilever around a vertical axis is further disposed on a bottom portion of the cantilever. The pumping hose lifting mechanism is fixedly mounted on the cantilever, and comprises a wire rope traction roller and a wire rope traction guide wheel. The wire rope traction roller comprises a roller drive and a traction wire rope wound on the wire rope traction roller. The traction wire rope has one end fixedly connected to the wire rope traction roller and the other end connected to the pumping hose.

As an implementation of the control mode of the members of the present invention such as the rotary drive of the rotary bearing, the front support extension and retraction control member, the wheel lifting control member, the plug board lifting control member, the rollback stopping safety member, and the self-priming device, the rotary drive of the rotary bearing, the cantilever rotary drive of the self-priming device, and the roller drive of the self-priming device are all rotary motors. The front support extension and retraction control member, the wheel lifting control member, and the plug board lifting control member are all electric screws. The pressurized water input port of the water turbine box is provided with an electric control valve. The rollback stopping safety member is an electric control contact switch. The self-priming water turbine-driven reel sprinkler irrigation machine further comprises an electric control device. The electric control device comprises a power circuit and a controller. The controller is electrically connected to the rotary drive of the rotary bearing, the cantilever rotary drive of the self-priming device, the roller drive of the self-priming device, the front support extension and retraction control member, the wheel lifting control member, the plug board lifting control member, the electric control valve of the water turbine box, and the electric control contact switch, respectively.

As another implementation of the control mode of the members of the present invention such as the rotary drive of the rotary bearing, the front support extension and retraction control member, the wheel lifting control member, the plug board lifting control member, the rollback stopping safety member, and the self-priming device, the rotary drive of the rotary bearing, the cantilever rotary drive of the self-priming device, and the roller drive of the self-priming device are all rotary hydraulic motors. The front support extension and retraction control member, the wheel lifting control member, and the plug board lifting control member are all hydraulic cylinders. The pressurized water input port of the water turbine box is provided with a hydraulic control valve. The rollback stopping safety member is a hydraulic control safety valve. The self-priming water turbine-driven reel sprinkler irrigation machine further comprises a hydraulic control device. The hydraulic control device comprises a hydraulic pump station. The hydraulic pump station comprises a driving power source, a hydraulic pump, a hydraulic control valve bank, and a hydraulic oil tank. The driving power source is connected to the hydraulic pump. An input end of the hydraulic pump is connected to the hydraulic oil tank, and an output end of the hydraulic pump is connected to the hydraulic control valve bank. The hydraulic control valve bank is connected to the rotary drive of the rotary bearing, the cantilever rotary drive of the self-priming device, the roller drive of the self-priming device, the front support extension and retraction control member, the wheel lifting control member, the plug board lifting control member, the hydraulic control valve of the water turbine box, and the hydraulic control safety valve through hydraulic pipelines, respectively.

As a further improvement of the present invention, the reel support frame comprises support boundary beams and support cross beams having a cavity structure. The support boundary beams and the support cross beams are connected in a closed loop, and the cavity structures of the support boundary beams and the support cross beams form a closed communication space. The hydraulic oil tank of the hydraulic pump station is the closed communication space inside the reel support frame.

As an implementation of the driving power source of the hydraulic pump station and the pumping power source of the self-priming device of the present invention, the driving power source of the hydraulic pump station and the pumping power source of the self-priming device are an engine. The engine comprises a fuel tank. A power output shaft of the engine is connected to the hydraulic pump of the hydraulic pump station and the water pump of the self-priming device, respectively, through a power distribution mechanism.

As a further improvement of the present invention, the reel support frame comprises support boundary beams and a support cross beams having a cavity structure. The support boundary beams and the support cross beams are connected in a closed loop, and the cavity structures of the support boundary beams and the support cross beams form a closed communication space. The fuel tank of the engine is the closed communication space inside the reel support frame.

As an implementation of the mating mounting and connection mode of the rotary drive of the rotary bearing and the outer ring of the rotary bearing of the present invention, the rotary drive of the rotary bearing is matingly mounted and connected to the outer ring of the rotary bearing through a gear and rack transmission mechanism. The outer ring of the rotary bearing is an outer gear ring structure having a rack in a circumferential direction of an outer surface. A power output end of the rotary drive of the rotary bearing is provided with a driving gear mating and meshed with teeth of the outer gear ring structure of the outer ring of the rotary bearing.

As a preferred version of the present invention, a front end of the plug board is hingedly mounted on a rear end of the plug board support frame. The plug board lifting control member has one end hingedly mounted on the plug board support frame and the other end hingedly mounted on the plug board.

As a further improvement of the present invention, the sprinkler wagon is provided with a self-propelled driving device.

Compared with the prior art, the self-priming water turbine-driven reel sprinkler irrigation machine is equipped with a self-priming device, and thus can provide a pressurized water source for sprinkler irrigation by placing the pumping hose and the filtering mechanism of the self-priming device in the irrigation canal, immerging the same below the water surface and starting the water pump, so as to achieve self-pumping and sprinkler irrigation operation. Because of the underframe rotary device disposed at the bottom portion of the underframe, the telescopic front support vertically disposed at the front part of the underframe, and the wheel assemblies hingedly connected to the rear part of the bottom portion of the underframe, when the hydraulic control valve bank is operated to control the front support extension and retraction control member of the telescopic front support and the wheel lifting hydraulic cylinder to be retracted simultaneously, the over underframe is lowered such that the support base plane of the chassis support member is stably supported on the ground, and the chassis support member is in a state of completely bearing the machine weight. When the rotary drive of the rotary bearing is controlled to rotate, the overall underframe can rotate relative to the chassis support member, such that a direction of the sprinkler wagon can be flexibly adjusted according to a sprinkler irrigation direction, and a traction direction of the whole machine can be flexibly adjusted according to a direction of the traction apparatus, thereby reducing excessive crushing of the crops in the fields under the premise of facilitating turnaround. The wheel assembly comprises a wheel support beam, a wheel, and a wheel lifting control member, and therefore, the wheels are lifted by controlling the extension and retraction of the wheel lifting hydraulic cylinder, so at to control the distance between the support base plane of the chassis support member and the ground, thereby avoiding scratching of the chassis caused by the uneven turnaround road surface, which is especially suitable for the sprinkler irrigation operation in the fields adjacent to the irrigation canals and without a pressurized water hydrant.

Figure 1:
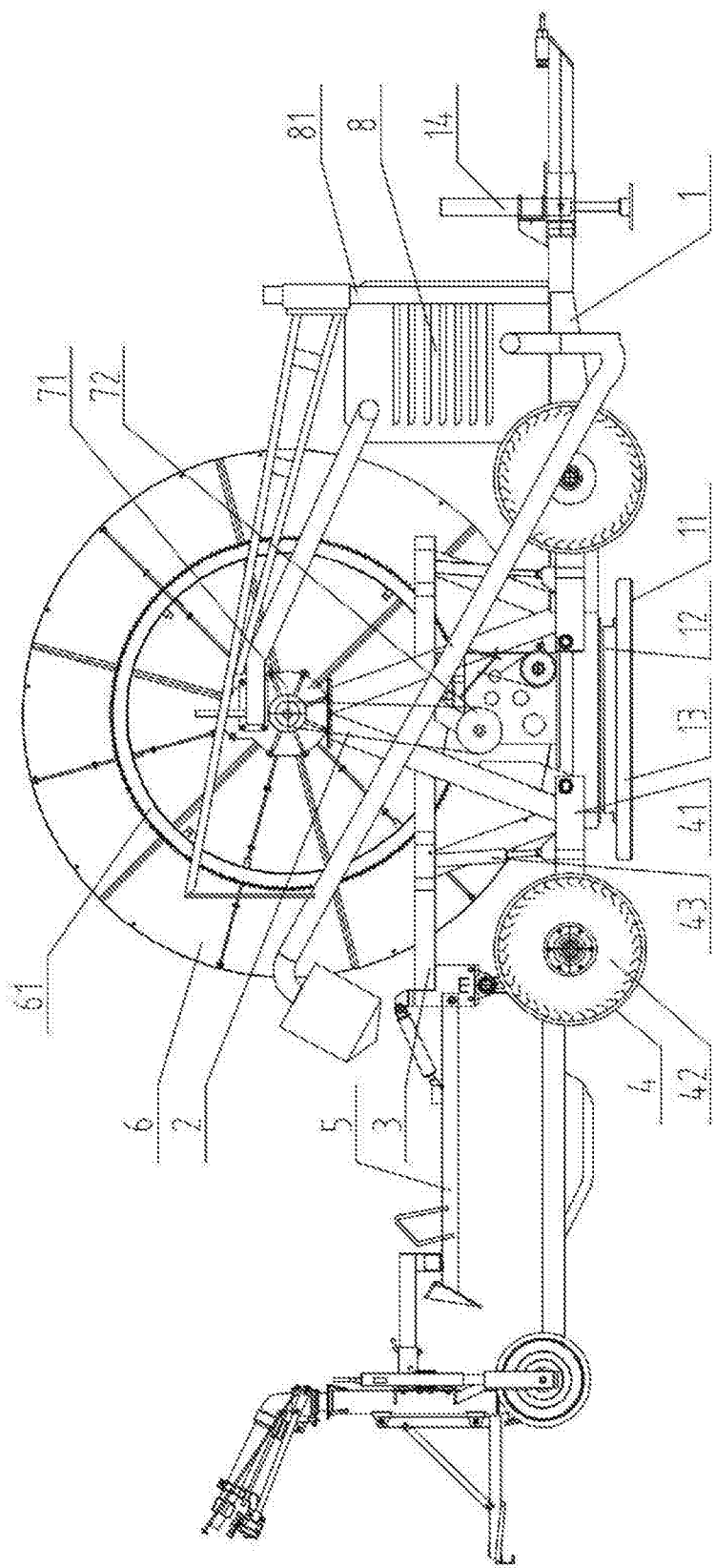
FIG. 1 is a schematic structural diagram of the present invention.

In the drawings: 1 underframe; 11 underframe rotary device; 12 rotary bearing; 13 chassis support member; 14 telescopic front support; 2 reel support frame; 3 plug board support frame; 4 wheel assembly; 41 wheel support beam; 42 wheel; 43 wheel lifting control member; 5 plug board; 6 reel; 61 annular outer gear ring; 7 water turbine driving device; 71 water turbine box; 72 reel driving gearbox; 8 self-priming device; 81 pumping hose suspension bracket.

DESCRIPTION OF THE EMBODIMENTS

The present invention is further described below in conjunction with the accompanying drawings (description is made below by using the traction direction of the self-priming water turbine-driven reel sprinkler irrigation machine as the front).

Figure 2:
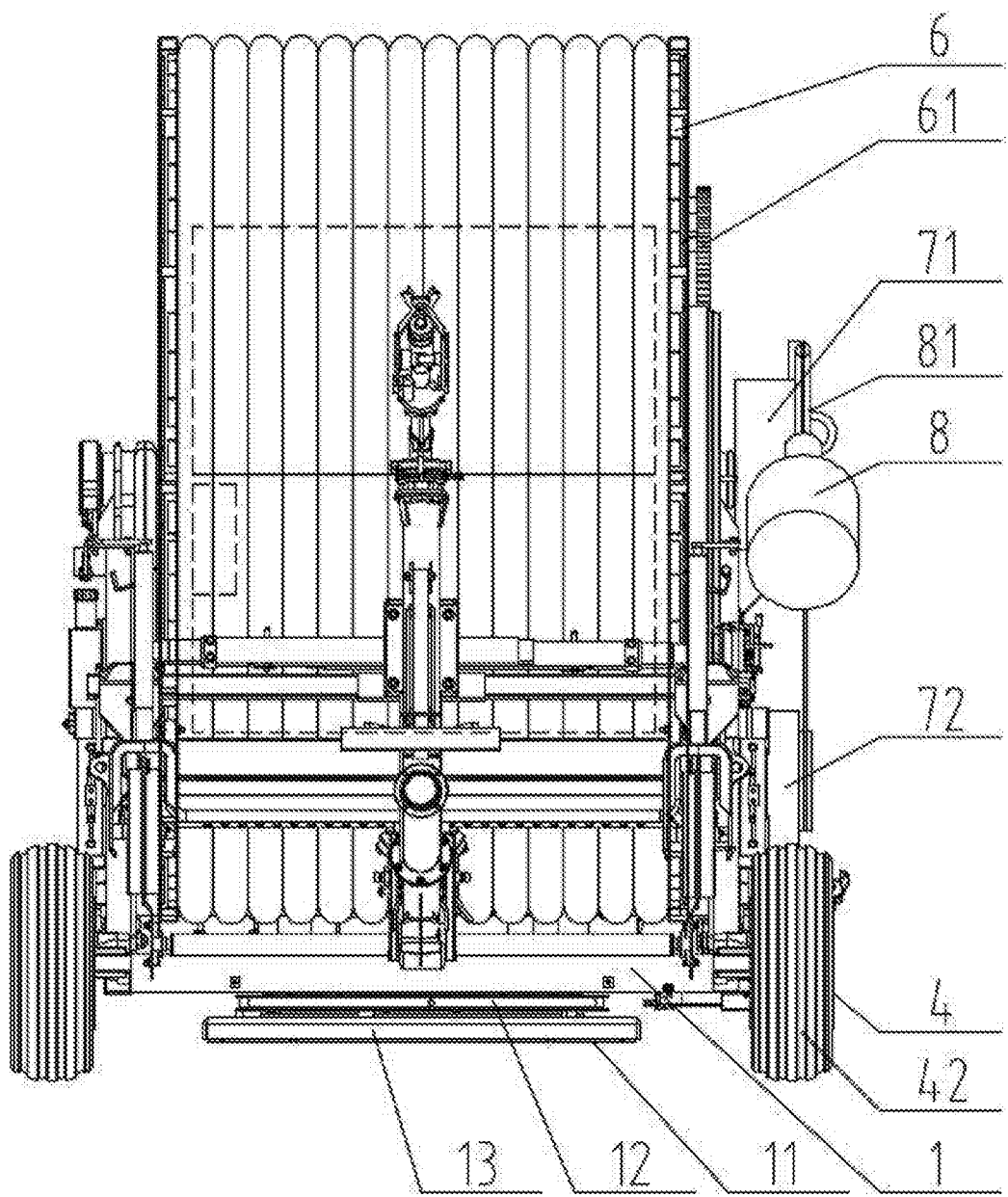
FIG. 2 is a left view of FIG. 1.
Figure 3:
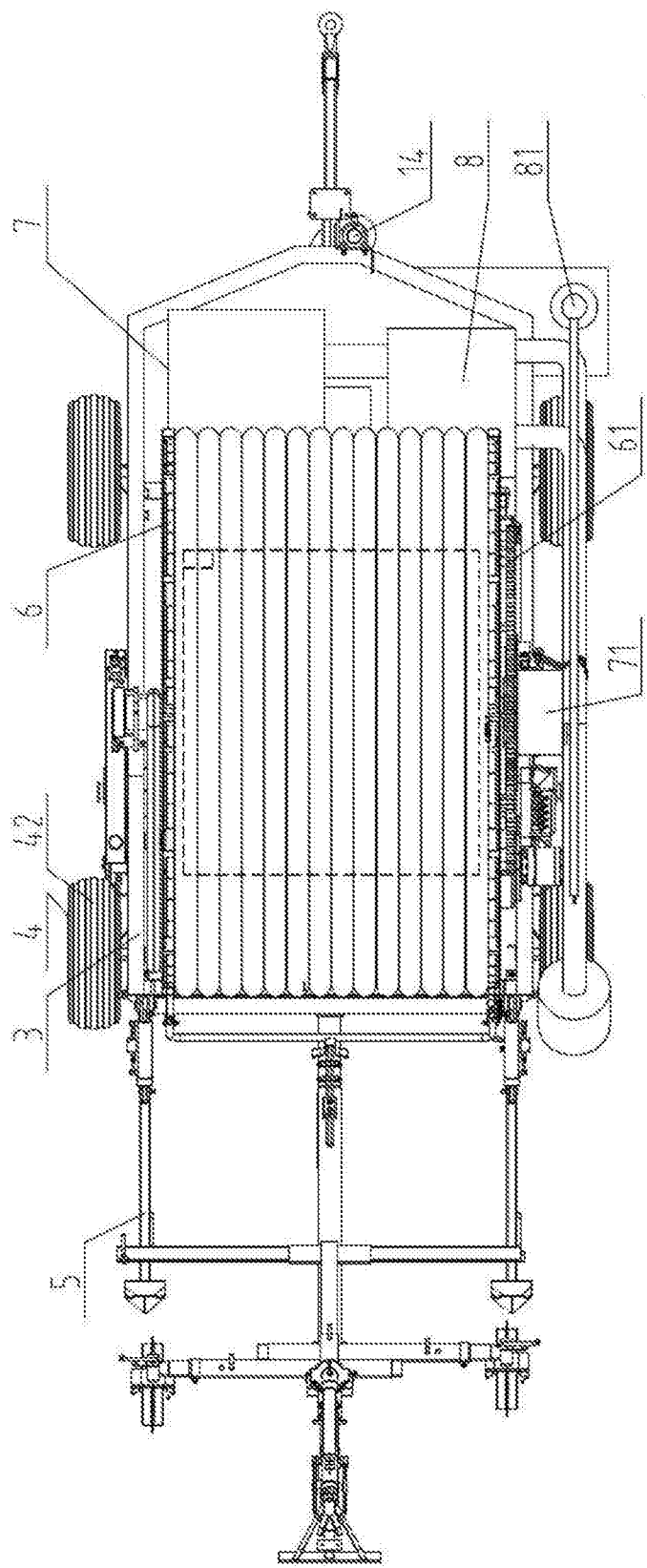
FIG. 3 is a top view of FIG. 1.

As shown in FIG. 1 to FIG. 3, the self-priming water turbine-driven reel sprinkler irrigation machine comprises a framework, a plug board 5, a reel 6, a PE pipe, a water turbine driving device 7, a sprinkler wagon, and a self-priming device 8.

Figure 4:
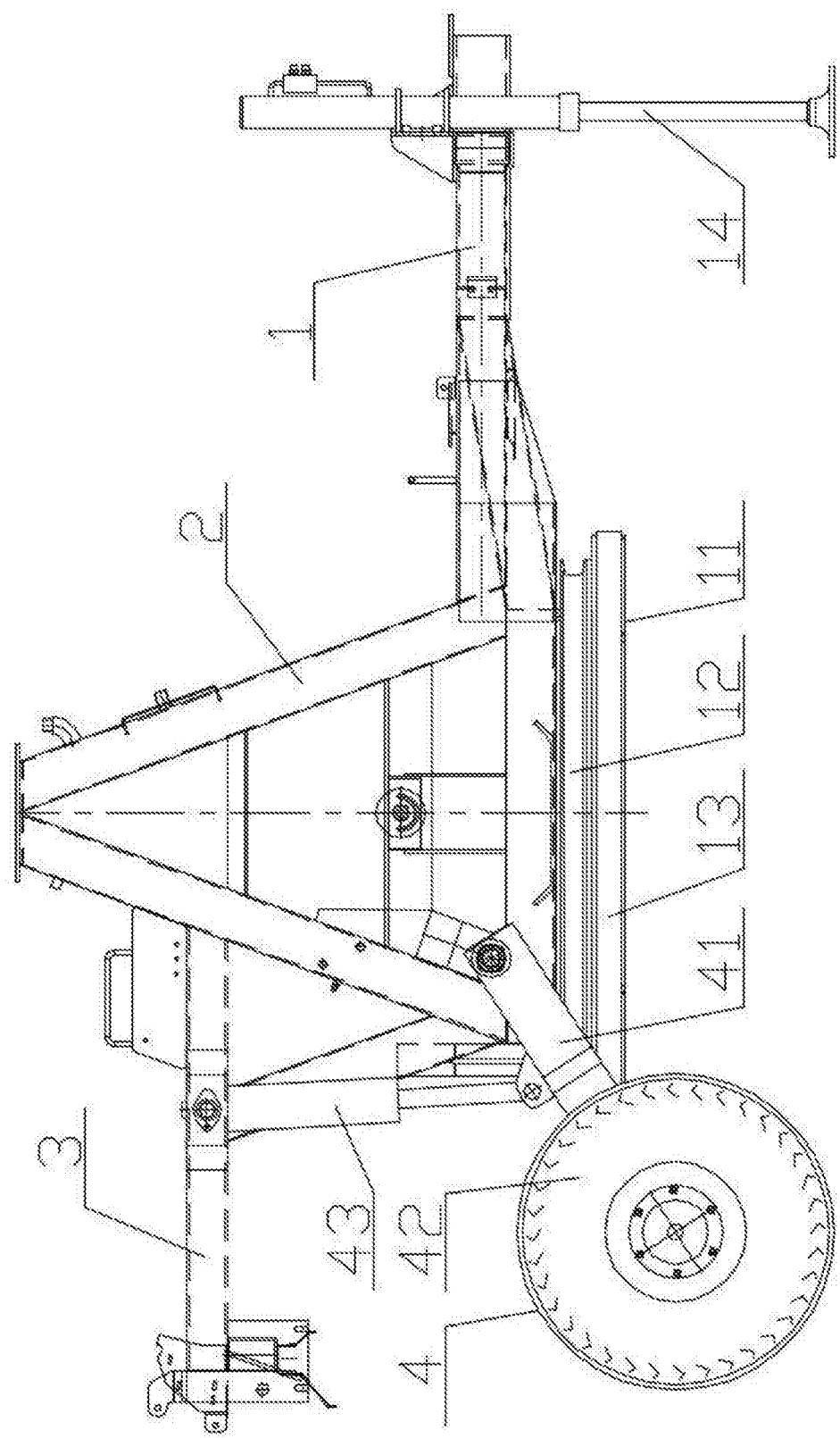
FIG. 4 is a schematic structural diagram of a framework of the present invention.
Figure 5:
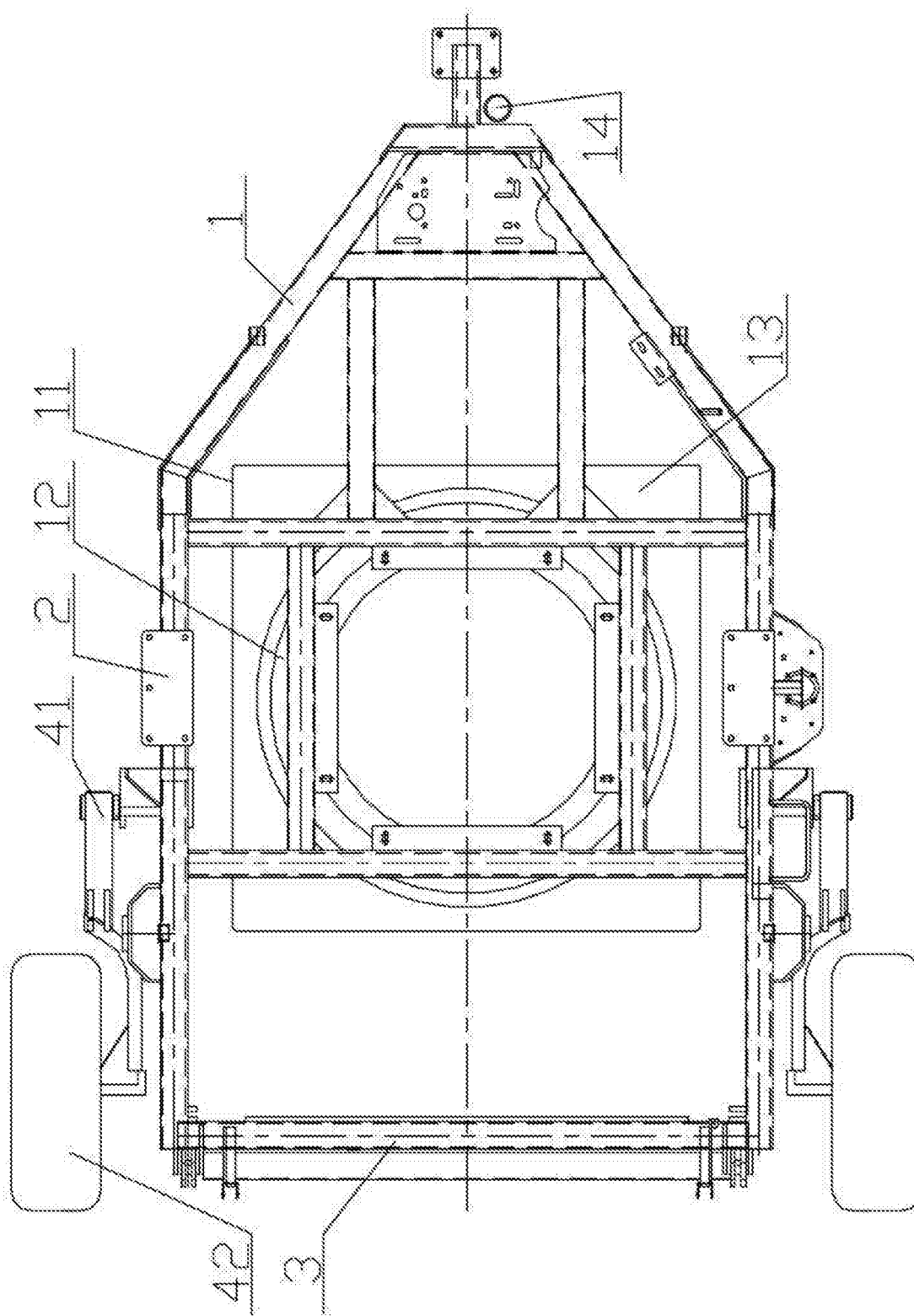
FIG. 5 is a top view of FIG. 4.

As shown in FIG. 4 and FIG. 5, the framework comprises an underframe 1, a reel support frame 2, a plug board support frame 3, and a wheel assembly 4.

Figure 6:
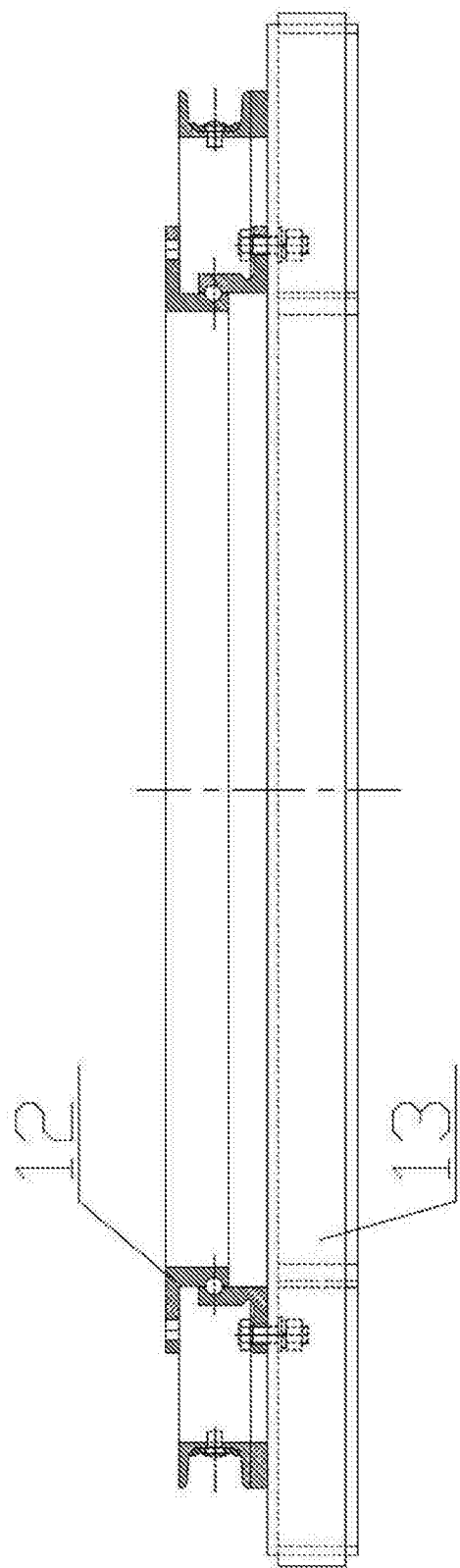
FIG. 6 is a schematic structural diagram of an underframe rotary device of the present invention.

The underframe 1 is a planar support frame structure that is bilaterally symmetrical as a whole, and the support frame structure comprises boundary beams connected in a closed loop to form an annular frame structure and support beams connected to an interior of the annular frame structure. A traction connecting mechanism capable of connecting a traction apparatus is disposed at a front end of the underframe 1. A bottom portion of the underframe 1 is provided with an underframe rotary device 11, and the underframe rotary device 11 is disposed at a center of gravity of the framework. As shown in FIG. 6, the underframe rotary device 11 comprises a rotary bearing 12 and a chassis support member 13 sequentially from top to bottom. The rotary bearing 12 comprises an inner ring, an outer ring, and a rotary drive. The inner ring of the rotary bearing 12 is fixedly mounted and connected to the underframe 1, the outer ring of the rotary bearing 12 is fixedly mounted and connected to the chassis support member 13, and the rotary drive of the rotary bearing 12 is fixedly mounted on the underframe 1 and is matingly mounted and connected to the outer ring of the rotary bearing 12 through a transmission mechanism. Relative movement of the inner ring and the outer ring of the rotary bearing 12 can be achieved by controlling rotation of the rotary drive of the rotary bearing 12. The chassis support member 13 is provided with a flat support base plane. In order to ensure stable support, a coverage area of the support base plane of the chassis support member 13 is greater than that of the rotary bearing 12. A telescopic front support 14 is further vertically disposed at a front part of the underframe 1, and the telescopic front support 14 comprises a front support extension and retraction control member. An extended support state or a retracted turnaround state of the telescopic front support 14 can be achieved by controlling the extension and retraction of the front support extension and retraction control member.

Two reel support frames 2 are provided, and the two reel support frames 2 are symmetrically and vertically mounted on the planar support frame structure of the underframe 1 corresponding in position to the underframe rotary device 11.

Two plug board support frames 3 are provided, and the two plug board support frames 3 are symmetrically and fixedly mounted on the underframe 1 or the reel support frame 2, and the plug board support frames 3 extends rearwards.

Two wheel assemblies 4 are provided, and the two wheel assemblies 4 are symmetrically mounted at a rear part of the bottom portion of the underframe 1. The wheel assembly 4 comprises a wheel support beam 41, a wheel 42, and a wheel lifting control member 43. A front end of the wheel support beam 41 is hingedly connected to the underframe 1, and the wheel 42 is provided to roll back and forth and is mounted and connected to a rear end of the wheel support beam 41. The wheel lifting control member 43 has one end connected to the reel support frame 2 or the plug board support frame 3 and the other end connected to the wheel support beam 41. The lifting of the wheel 42 can be achieved by controlling the extension and retraction of the wheel lifting control member 43. When the wheel lifting control member 43 is completely retracted, a horizontal plane where a bottom portion of the wheel 42 is located is located above the support base plane of the chassis support member 13, that is, when the wheel lifting control member 43 is completely retracted, the wheel 42 is in suspension.

Two plug boards 5 are provided, and the two plug boards 5 are symmetrically mounted on a rear end of the plug board support frame 3. The plug board 5 is provided with a sprinkler wagon return limiting member, and comprises a plug board lifting control member and a rollback stopping safety member. The rollback stopping safety member is disposed on the sprinkler wagon return limiting member.

The reel 6 is provided to roll back and forth and is erected at a top of the reel support frame 2 through a bearing, and left and right side plates of the reel 6 are provided with annular outer gear rings 61 concentric to the reel 6.

The PE pipe is wound on the reel 6, and an input end of the PE pipe penetrates through an axial center of the reel 6.

The water turbine driving device 7 comprises a water turbine box 71 and a reel driving gearbox 72. The water turbine box 71 is fixedly mounted on the reel support frame 2. The water turbine box 71 comprises a pressurized water input port, a pressurized water output port, and a water turbine disposed inside the water turbine box. The pressurized water output port of the water turbine box 71 communicates with an input end of the PE pipe. The water turbine of the water turbine box 71 comprises a power output shaft. The reel driving gearbox 72 is fixedly mounted on the underframe 1. The reel driving gearbox 72 comprises a power input shaft and a power output shaft. The power input shaft of the reel driving gearbox 72 is connected to the power output shaft of the water turbine of the water turbine box 71 through the transmission mechanism, and the power output shaft of the reel driving gearbox 72 is matingly connected to the annular outer gear ring 61 through the transmission mechanism.

The sprinkler wagon comprises a sprinkler frame, a support wheel, and a sprinkler. The support wheel is mounted at a bottom portion of the sprinkler frame. The sprinkler is fixedly erected on the sprinkler frame, and an input end of the sprinkler is connected to an output end of the PE pipe. The sprinkler frame is provided with a collision block corresponding in position to the rollback stopping safety member of the plug board 5.

The self-priming device 8 is fixedly mounted on the underframe 1, and comprises a pumping power source, a water pump, a pumping hose, and a filtering mechanism. The pumping power source is connected to the water pump. An input end of the water pump is connected to the filtering mechanism through the pumping hose, and an output end of the water pump is connected to the pressurized water input port of the water turbine box 71 through a pipeline.

When the self-priming water turbine-driven reel sprinkler irrigation machine is hauled by the traction apparatus to turn around, the PE pipe is in the state of being completely received and wound on the reel 6, the plug board lifting control member of the plug board 5 is in a completely retracted state, the sprinkler wagon is in the state of being suspended on the plug board 5, the wheel lifting control member 43 is in an extended state, the front support extension and retraction control member of the telescopic front support 14 is in a fully retracted state. At this time, the wheel 42 is lowered and supported on the ground, and a distance between the underframe 1 and the ground can be changed by controlling the expansion and contraction quantity of the wheel lifting control member 43.

When the self-priming water turbine-driven reel sprinkler irrigation machine is hauled to the fields to use, the front support extension and retraction control member of the telescopic front support 14 is first operated to extend such that the front part of the underframe 1 is stably supported, and the traction apparatus can be removed. Then, the front support extension and retraction control member of the telescopic front support 14 and the wheel lifting control member 43 are retracted simultaneously, the overall underframe 1 is lowered until the support base plane of the chassis support member 13 is stably supported on the ground, and at this time, the wheels 42 are in a state of suspending above the support base plane of the chassis support member 13, the telescopic front support 14 is in a state of suspending away from the ground, and the chassis support member 13 is in a state of completely bearing the machine weight. Then, the rotary drive of the rotary bearing 12 is controlled to rotate according to the sprinkler irrigation direction. Since the chassis support member 13 is in a state of completely bearing the machine weight, when the rotary drive of the rotary bearing 12 rotates, the outer ring is immobile, and the inner ring rotates relative to the outer ring. The underframe 1 bears the reel support frame 2, the plug board support frame 3, the wheel assembly 4, the plug board 5, the reel 6, the water turbine driving device 7, and the sprinkler wagon to rotate as a whole relative to the chassis support member 13. When the sprinkler wagon directly faces the sprinkler irrigation direction, the rotation of the rotary drive of the rotary bearing 12 is stopped. Then, the plug board lifting control member of the plug board 5 is extended such that the plug board 5 is stably supported on the ground. The sprinkler wagon is driven to lower to the ground in the extension process of the plug board 5. The sprinkler wagon is moved to a set sprinkler irrigation position, then the pumping hose and the filtering mechanism of the self-priming device 8 are placed in the irrigation canal and immerged below the water surface, and the pumping power source is started to operate the water pump. The pumped pressurized water enters the PE pipe and is sprinkled through the sprinkler of the sprinkler wagon to achieve the sprinkler irrigation operation. While the sprinkler irrigation operation is performed, a part of the pressurized water enters the water turbine box 71 to drive the water turbine in the water turbine box 71 to rotate, and output power through the power output shaft of the water turbine. The power output shaft of the water turbine in the water turbine box 71 drives, via the power input shaft of the reel driving gearbox 72 and the power output shaft of the reel driving gearbox 72, the annular outer gear ring 61 to rotate such that the reel 6 to roll back the PE pipe. When the sprinkler wagon returns to the collision block to touch the rollback stopping safety member of the plug board 5, the rollback stopping safety member cuts off input of the pressurized water into the water turbine box 71 such that the water turbine in the water turbine box 71 stops outputting power, and the reel 6 stops rollback. After the water pump is turned off, the pumping hose and the filtering mechanism of the self-priming device 8 are first retracted, then the plug board lifting control member of the plug board 5 is retracted to withdraw the plug board 5. The sprinkler wagon is lifted away from the ground in the process of withdrawing the plug board 5. Then, the rotary drive of the rotary bearing 12 is controlled according to the traction position of the traction apparatus such that the traction connecting mechanism of the underframe 1 directly faces the traction apparatus. The front support extension and retraction control member of the telescopic front support 14 and the wheel lifting control member 43 are then extended simultaneously such that the overall underframe 1 rises, the support base plane of the chassis support member 13 leaves the ground, and the wheels 42 and the telescopic front support 14 are supported on the ground. The traction apparatus is connected to the traction connecting mechanism of the underframe 1, and then the front support extension and retraction control member of the telescopic front support 14 is retracted, such that turnaround can be carried out.

In order to facilitate receiving the pumping hose and thus facilitate turnaround, as a further improvement of the present invention, the self-priming device 8 further comprises a pumping hose suspension bracket 81, and the pumping hose suspension bracket 81 comprises a cantilever and a pumping hose lifting mechanism. A bottom end of the cantilever is fixedly mounted on the underframe 1. A cantilever rotary drive for rotating the cantilever around a vertical axis is further disposed on a bottom portion of the cantilever. The pumping hose lifting mechanism is fixedly mounted on the cantilever, and comprises a wire rope traction roller and a wire rope traction guide wheel. The wire rope traction roller comprises a roller drive and a traction wire rope wound on the wire rope traction roller. The traction wire rope has one end fixedly connected to the wire rope traction roller and the other end connected to the pumping hose. The cantilever drives the pumping hose to stay at an appropriate water-taking position in the cantilever rotary range by controlling the movement of the rotary drive of the cantilever, and the pumping hose is lifted by controlling the movement of the roller drive.

As an implementation of a control mode of the members of the present invention such as the rotary drive of the rotary bearing 12, the front support extension and retraction control member, the wheel lifting control member 43, the plug board lifting control member, the rollback stopping safety member, and the self-priming device 8, the control mode of various members is an electric control mode, that is, the rotary drive of the rotary bearing 12, the cantilever rotary drive of the self-priming device 8, and the roller drive of the self-priming device 8 are all rotary motors. The front support extension and retraction control member, the wheel lifting control member 43, and the plug board lifting control member are all electric screws. The pressurized water input port of the water turbine box 71 is provided with an electric control valve. The rollback stopping safety member is an electric control contact switch. The self-priming water turbine-driven reel sprinkler irrigation machine further comprises an electric control device. The electric control device comprises a power circuit and a controller. The controller is electrically connected to the rotary drive of the rotary bearing 12, the cantilever rotary drive of the self-priming device 8, the roller drive of the self-priming device 8, the front support extension and retraction control member, the wheel lifting control member 43, the plug board lifting control member, the electric control valve of the water turbine box 71, and the electric control contact switch, respectively.

As another implementation of the control mode of the members of the present invention such as the rotary drive of the rotary bearing 12, the front support extension and retraction control member, the wheel lifting control member 43, the plug board lifting control member, the rollback stopping safety member, and the self-priming device 8, the control mode of various members is a hydraulic control mode, that is, the rotary drive of the rotary bearing 12, the cantilever rotary drive of the self-priming device 8, and the roller drive of the self-priming device 8 are all rotary hydraulic motors. The front support extension and retraction control member, the wheel lifting control member 43, and the plug board lifting control member are all hydraulic cylinders. The pressurized water input port of the water turbine box 71 is provided with a hydraulic control valve.

The rollback stopping safety member is a hydraulic control safety valve. The self-priming water turbine-driven reel sprinkler irrigation machine further comprises a hydraulic control device. The hydraulic control device comprises a hydraulic pump station. The hydraulic pump station comprises a driving power source, a hydraulic pump, a hydraulic control valve bank, and a hydraulic oil tank. The driving power source is connected to the hydraulic pump. An input end of the hydraulic pump is connected to the hydraulic oil tank, and an output end of the hydraulic pump is connected to the hydraulic control valve bank. The hydraulic control valve bank is connected to the rotary drive of the rotary bearing 12, the cantilever rotary drive of the self-priming device 8, the roller drive of the self-priming device 8, the front support extension and retraction control member, the wheel lifting control member 43, the plug board lifting control member, the hydraulic control valve of the water turbine box 71, and the hydraulic control safety valve through hydraulic pipelines, respectively.

In order to take full advantage of the space and reduce additional space occupation of the hydraulic oil tank, as a further improvement of the present invention, the reel support frame 2 comprises support boundary beams and support cross beams having a cavity structure. The support boundary beams and the support cross beams are connected in a closed loop, and the cavity structures of the support boundary beams and the support cross beams form a closed communication space. The hydraulic oil tank of the hydraulic pump station is the closed communication space inside the reel support frame 2. The reel support frame 2 having a cavity structure can reduce additional space occupation of the hydraulic oil tank, making the structure more compact.

As an implementation of the driving power source of the hydraulic pump station and the pumping power source of the self-priming device of the present invention, the driving power source of the hydraulic pump station and the pumping power source of the self-priming device 8 are an engine. The engine comprises a fuel tank. A power output shaft of the engine is connected to the hydraulic pump of the hydraulic pump station and the water pump of the self-priming device 8, respectively, through a power distribution mechanism.

In order to take full advantage of the space and reduce additional space occupation of the fuel tank, as a further improvement of the present invention, the reel support frame 2 comprises support boundary beams and support cross beams having a cavity structure. The support boundary beams and the support cross beams are connected in a closed loop, and the cavity structures of the support boundary beams and the support cross beams form a closed communication space. The fuel tank of the engine is the closed communication space inside the reel support frame 2. The reel support frame 2 having a cavity structure can reduce additional space occupation of the fuel tank, making the structure more compact.

As an implementation of the mating mounting and connection mode of the rotary drive of the rotary bearing 12 and the outer ring of the rotary bearing 12 of the present invention, the rotary drive of the rotary bearing 12 is matingly mounted and connected to the outer ring of the rotary bearing 12 through a gear and rack transmission mechanism. The outer ring of the rotary bearing 12 is an outer gear ring structure having a rack in a circumferential direction of an outer surface. A power output end of the rotary drive of the rotary bearing 12 is provided with a driving gear mating and meshed with teeth of the outer gear ring structure of the outer ring of the rotary bearing 12.

The plug board 5 may be a fixed inclined telescopic plug board structure disposed in a linear telescopic mode, inclined rearwards and downwards and fixedly mounted at the rear end of the plug board support frame 3, and may also be a hinged swinging lifting plug board structure hingedly mounted at the rear end of the plug board support frame 3. Since the plug board lifting control member of the former structure is generally disposed inside the plug board 5, it is complex to fabricate and mount. The plug board lifting control member of the latter structure is disposed outside the plug board 5, it is relatively simple to fabricate and mount. Therefore, the latter structure is preferred. That is, as a preferred version of the present invention, a front end of the plug board 5 is hingedly mounted at the rear end of the plug board support frame 3, and the plug board lifting control member has one end hingedly mounted on the plug board support frame 3 and the other end hingedly mounted on the plug board 5.

In order to reduce crushing of the traction apparatus to the crops in the fields, as a further improvement of the present invention, the sprinkler wagon is provided with a self-propelled driving device. The self-propelled driving device can drive the sprinkler wagon to pull out the PE pipe in self-propelled traction, so as to reduce crushing of the traction apparatus to the crops in the fields. The self-propelled driving device can adopt a motor-controlled or engine-controlled driving structure.

The self-priming water turbine-driven reel sprinkler irrigation machine is equipped with a self-priming device 8, and thus can provide a pressurized water source for sprinkler irrigation by placing the pumping hose and the filtering mechanism of the self-priming device 8 in the irrigation canal, immerging the same below the water surface and starting the water pump, so as to achieve self-pumping and sprinkler irrigation operation. Because of the underframe rotary device 11 disposed at the bottom of the underframe 1, the telescopic front support 14 vertically disposed at the front part of the underframe 1, and the wheel assemblies 4 hingedly connected to the rear part of the bottom of the underframe 1, when the hydraulic control valve bank is operated to control the front support extension and retraction control member of the telescopic front support 14 and the wheel lifting control member 43 to be retracted simultaneously, the overall underframe 1 is lowered such that the support base plane of the chassis support member 13 is stably supported on the ground, and the chassis support member 13 is in a state of completely bearing the machine weight. When the rotary drive of the rotary bearing 12 is controlled to rotate, the overall underframe 1 can rotate relative to the chassis support member 13, such that the direction of the sprinkler wagon can be flexibly adjusted according to the sprinkler irrigation direction, and the traction direction of the whole machine can be flexibly adjusted according to the direction of the traction apparatus, thereby reducing excessive crushing of the crops in the fields under the premise of facilitating turnaround. The wheel assembly 4 comprises a wheel support beam 41, a wheel 42, and a wheel lifting control member 43, and therefore, the wheels 42 are lifted by controlling the extension and retraction of the wheel lifting hydraulic cylinder 43, so as to control the distance between the support base plane of the chassis support member 13 and the ground, thereby avoiding scratching of the chassis caused by the uneven turnaround road surface, which is especially suitable for the sprinkler irrigation operation in the fields adjacent to the irrigation canals and without a pressurized water hydrant.

What is claimed is:

1. A self-priming water turbine-driven reel sprinkler irrigation machine, comprising a framework, a plug board, a reel, a PE pipe, a water turbine driving device, a sprinkler wagon, and a self-priming device, wherein:

the framework comprises an underframe, a reel support frame, a plug board support frame, and a wheel assembly;

the underframe is a planar support frame structure that is bilaterally symmetrical as a whole, and the planar support frame structure comprises boundary beams connected in a closed loop to form an annular frame structure and support beams connected to an interior of the annular frame structure; a traction connecting mechanism is disposed at a front end of the underframe; a bottom portion of the underframe is provided with an underframe rotary device, and the underframe rotary device is disposed at a center of gravity of the framework and the underframe rotary device comprises a rotary bearing and a chassis support member sequentially from top to bottom; the rotary bearing comprises an inner ring, an outer ring, and a rotary drive; the inner ring of the rotary bearing is fixedly mounted and connected to the underframe, the outer ring of the rotary bearing is fixedly mounted and connected to the chassis support member, and the rotary drive of the rotary bearing is fixedly mounted on the underframe, and the rotary drive of the rotary bearing is matingly mounted and connected to the outer ring of the rotary bearing through a transmission mechanism; the chassis support member is provided with a flat support base plane; a telescopic front support is further disposed at a front part of the underframe, and the telescopic front support comprises a front support extension and retraction control member;

two reel support frames are provided, and the two reel support frames are symmetrically and vertically mounted on the planar support frame structure of the underframe corresponding in position to the underframe rotary device;

two plug board support frames are provided, and the two plug board support frames are symmetrically and fixedly mounted on the underframe or the reel support frames, and the plug board support frames extend rearwards of the telescopic front support;

two wheel assemblies are provided, and the two wheel assemblies are symmetrically mounted at a rear part of the bottom portion of the underframe; each wheel assembly comprises a wheel support beam, a wheel, and a wheel lifting control member; a front end of the wheel support beam is hingedly connected to the underframe, and the wheel is provided to roll back and forth and is mounted and connected to a rear end of the wheel support beam; the wheel lifting control member has one end connected to the reel support frame or the plug board support frame and the other end connected to the wheel support beam; and when the wheel lifting control member is completely retracted, a horizontal plane where a bottom portion of the wheel is located above the support base plane of the chassis support member;

two plug boards are provided, and the two plug boards are symmetrically mounted on a rear end of the plug board support frame; each plug board is provided with a sprinkler wagon return limiting member, and each plug board comprises a plug board lifting control member and a rollback stopping safety member, and the rollback stopping safety member is disposed on the sprinkler wagon return limiting member;

the reel is provided to roll back and forth and is erected at a top of the reel support frame through a bearing, and left and right side plates of the reel are provided with annular outer gear rings concentric to the reel;

the PE pipe is wound on the reel, and an input end of the PE pipe penetrates through an axial center of the reel;

the water turbine driving device comprises a water turbine box and a reel driving gearbox; the water turbine box is fixedly mounted on the reel support frame, and the water turbine box comprises a pressurized water input port, a pressurized water output port, and a water turbine disposed inside the water turbine box; the pressurized water output port of the water turbine box communicates with the input end of the PE pipe, the water turbine of the water turbine box comprises a power output shaft; the reel driving gearbox is fixedly mounted on the underframe, and the reel driving gearbox comprises a power input shaft and a power output shaft; the power input shaft of the reel driving gearbox is connected to the power output shaft of the water turbine of the water turbine box through the transmission mechanism, and the power output shaft of the reel driving gearbox is matingly connected to the annular outer gear ring through the transmission mechanism;

the sprinkler wagon comprises a sprinkler frame, a support wheel, and a sprinkler; the support wheel is mounted at a bottom portion of the sprinkler frame; the sprinkler is fixedly erected on the sprinkler frame, and an input end of the sprinkler is connected to an output end of the PE pipe; and the sprinkler frame is provided with a collision block corresponding in position to the rollback stopping safety member of the plug board; and the self-priming device is fixedly mounted on the underframe, and comprises a pumping power source, a water pump, a pumping hose, and a filtering mechanism; the pumping power source is connected to the water pump, an input end of the water pump is connected to the filtering mechanism through the pumping hose, and an output end of the water pump is connected to the pressurized water input port of the water turbine box through a pipeline.

2. The self-priming water turbine-driven reel sprinkler irrigation machine according to claim 1, wherein the self-priming device further comprises a pumping hose suspension bracket, and the pumping hose suspension bracket comprises a cantilever and a pumping hose lifting mechanism; a bottom end of the cantilever is fixedly mounted on the underframe; a cantilever rotary drive for rotating the cantilever around a vertical axis is further disposed on a bottom portion of the cantilever; the pumping hose lifting mechanism is fixedly mounted on the cantilever, and comprises a wire rope traction roller and a wire rope traction guide wheel; the wire rope traction roller comprises a roller drive and a traction wire rope wound on the wire rope traction roller; the traction wire rope has one end fixedly connected to the wire rope traction roller and the other end connected to the pumping hose.

3. The self-priming water turbine-driven reel sprinkler irrigation machine according to claim 2, wherein the rotary drive of the rotary bearing, the cantilever rotary drive of the self-priming device, and the roller drive of the self-priming device are all rotary motors; the front support extension and retraction control member, the wheel lifting control member, and the plug board lifting control member are all electric screws; the pressurized water input port of the water turbine box is provided with an electric control valve; the rollback stopping safety member is an electric control contact switch; the self-priming water turbine-driven reel sprinkler irrigation machine further comprises an electric control device; the electric control device comprises a power circuit and a controller; the controller is electrically connected to the rotary drive of the rotary bearing, the cantilever rotary drive of the self-priming device, the roller drive of the self-priming device, the front support extension and retraction control member, the wheel lifting control member, the plug board lifting control member, the electric control valve of the water turbine box, and the electric control contact switch, respectively.

4. The self-priming water turbine-driven reel sprinkler irrigation machine according to claim 2, wherein the rotary drive of the rotary bearing, the cantilever rotary drive of the self-priming device, and the roller drive of the self-priming device are all rotary hydraulic motors; the front support extension and retraction control member, the wheel lifting control member, and the plug board lifting control member are all hydraulic cylinders; the pressurized water input port of the water turbine box is provided with a hydraulic control valve; the rollback stopping safety member is a hydraulic control safety valve; the self-priming water turbine-driven reel sprinkler irrigation machine further comprises a hydraulic control device, the hydraulic control device comprises a hydraulic pump station, and the hydraulic pump station comprises a driving power source, a hydraulic pump, a hydraulic control valve bank, and a hydraulic oil tank; the driving power source is connected to the hydraulic pump; an input end of the hydraulic pump is connected to the hydraulic oil tank, and an output end of the hydraulic pump is connected to the hydraulic control valve bank; and the hydraulic control valve bank is connected to the rotary drive of the rotary bearing, the cantilever rotary drive of the self-priming device, the roller drive of the self-priming device, the front support extension and retraction control member, the wheel lifting control member, the plug board lifting control member, the hydraulic control valve of the water turbine box, and the hydraulic control safety valve through hydraulic pipelines, respectively.

5. The self-priming water turbine-driven reel sprinkler irrigation machine according to claim 4, wherein the reel support frame comprises support boundary beams and support cross beams having a cavity structure; the support boundary beams and the support cross beams are connected in a closed loop, and the cavity structures of the support boundary beams and the support cross beams form a closed communication space; and the hydraulic oil tank of the hydraulic pump station is the closed communication space inside the reel support frame.

6. The self-priming water turbine-driven reel sprinkler irrigation machine according to claim 4, wherein the driving power source of the hydraulic pump station and the pumping power source of the self-priming device are an engine; the engine comprises a fuel tank; and a power output shaft of the engine is connected to the hydraulic pump of the hydraulic pump station and the water pump of the self-priming device, respectively, through a power distribution mechanism.

7. The self-priming water turbine-driven reel sprinkler irrigation machine according to claim 6, wherein the reel support frame comprises support boundary beams and support cross beams having a cavity structure; the support boundary beams and the support cross beams are connected in a closed loop, and the cavity structures of the support boundary beams and the support cross beams form a closed communication space; and the fuel tank of the engine is the closed communication space inside the reel support frame.

8. The self-priming water turbine-driven reel sprinkler irrigation machine according to claim 1, wherein the rotary drive of the rotary bearing is matingly mounted and connected to the outer ring of the rotary bearing through a gear and rack transmission mechanism; the outer ring of the rotary bearing is an outer gear ring structure having a rack in a circumferential direction of an outer surface; and a power output end of the rotary drive of the rotary bearing is provided with a driving gear mating and meshed with teeth of the outer gear ring structure of the outer ring of the rotary bearing.

9. The self-priming water turbine-driven reel sprinkler irrigation machine according to claim 1, wherein a front end of the plug board is hingedly mounted on a rear end of the plug board support frame; the plug board lifting control member has one end hingedly mounted on the plug board support frame and the other end hingedly mounted on the plug board.

10. The self-priming water turbine-driven reel sprinkler irrigation machine according to claim 1, wherein the sprinkler wagon is provided with a self-propelled driving device.

* * * * *